(12) United States Patent
Yang et al.

(10) Patent No.: US 10,656,292 B2
(45) Date of Patent: May 19, 2020

(54) WATER PUMPING AND INJECTING MULTI-LAYERED CONCENTRIC SPHERE NEUTRON SPECTROMETER

(71) Applicant: Chengdu University of Technology, Chengdu, Sichuan (CN)

(72) Inventors: Jianbo Yang, Sichuan (CN); Xianguo Tuo, Sichuan (CN); Yi Cheng, Sichuan (CN); Honghui Wang, Sichuan (CN); Lei Wang, Sichuan (CN); Mingzhe Liu, Sichuan (CN)

(73) Assignee: Chengdu University of Technology, Chengdu, Sichuan (CN)

( * ) Notice: Subject to any disclaimer, the term of this patent is extended or adjusted under 35 U.S.C. 154(b) by 228 days.

(21) Appl. No.: 15/942,366

(22) Filed: Mar. 30, 2018

(65) Prior Publication Data
US 2018/0224565 A1  Aug. 9, 2018

(30) Foreign Application Priority Data

Mar. 30, 2017  (CN) .......................... 2017 1 0201494

(51) Int. Cl.
*G01T 3/00* (2006.01)

(52) U.S. Cl.
CPC ............... *G01T 3/008* (2013.01); *G01T 3/00* (2013.01); *G01T 3/001* (2013.01)

(58) Field of Classification Search
None
See application file for complete search history.

(56) References Cited

U.S. PATENT DOCUMENTS

2011/0049380 A1*  3/2011  Dubeau ................. G01T 3/00
250/390.07

* cited by examiner

*Primary Examiner* — Edwin C Gunberg (57) ABSTRACT

A water pumping and injecting multi-layered concentric sphere neutron spectrometer includes a neutron detector, a plurality of shells concentrically provided, and a water pumping and injecting device; wherein an innermost shell surrounds a surface of the neutron detector; gaps are formed between adjacent shells for containing liquid; the shells are made of an aluminum material; a valve is arranged on each of the shells except the innermost shell; the water pumping and injecting device is connected to the valve of each of the shells except the innermost shell, so as to input water into the gaps or output the water from the gaps. Compared with conventional neutron spectrometer, weight of the water pumping and injecting multi-layered concentric sphere device and the neutron spectrum detection system of the present invention is greatly reduced, which is conducive to transportation and utilization. Meanwhile, combination of neutron spectrum data measurement and measurement data are increased.

16 Claims, 6 Drawing Sheets

WATER PUMPING AND INJECTING MULTI-LAYERED CONCENTRIC SPHERE NEUTRON SPECTROMETER

CROSS REFERENCE OF RELATED APPLICATION

The present invention claims priority under 35 U.S.C. 119(a-d) to CN 201710201494.3, filed Mar. 30, 2017.

BACKGROUND OF THE PRESENT INVENTION

Field of Invention

The present invention relates to a technical field of neutron energy spectrum detection, and more particularly to a water pumping and injecting multi-layered concentric sphere neutron spectrometer.

Description of Related Arts

Multi-sphere neutron spectrometer is commonly used for neutron spectrum detection due to a wide measurement range, isotropy, convenient measurement, etc. It employs thermal neutron detectors embedded in moderating spheres (polyethylene spherical shells) of different sizes. Comparison of the neutrons detected by each sphere allows accurate determination of the neutron energy. However, the polyethylene spherical shell needs to reach a certain thickness to ensure normal use, while the polyethylene exceeding a certain thickness will be heavy after being superposed, leading to inconvenient transportation. In order to ensure the testing needs, there should be a large number of layers for the polyethylene spherical shell, which further increases the weight of the multi-sphere neutron spectrometer.

SUMMARY OF THE PRESENT INVENTION

For overcoming defects of prior arts, an object of the present invention is to provides a water pumping and injecting multi-layered concentric sphere neutron spectrometer, which solves a problem that conventional multi-sphere neutron spectrometer is heavy, so as to be easily transported and used.

Accordingly, in order to accomplish the above objects, the present invention provides technical schemes as follows.

Firstly, the present invention provides a water pumping and injecting multi-layered concentric sphere device, comprising: a neutron detector, a plurality of shells concentrically provided, and a water pumping and injecting device; wherein an innermost shell of the shells surrounds a surface of the neutron detector; gaps are formed between adjacent shells for containing liquid; the shells are made of an aluminum material; a valve is arranged on each of the shells except the innermost shell; the water pumping and injecting device is connected to the valve of each of the shells except the innermost shell, so as to input water into the gaps or output the water from the gaps.

Preferably, the gaps have different widths from each other.

Preferably, the water pumping and injecting multi-layered concentric sphere device further comprises a lead shell, wherein the lead shell is provided on an external surface of one of the shells.

Preferably, the lead shell is provided on an external surface of a second shell or a third shell counting from inside to outside.

Preferably, thicknesses of the shells are 1 mm-5 mm.

Preferably, the thicknesses of the shells are all 2 mm.

Preferably, the water pumping and injecting device is a pipe whose surface has through holes.

Secondly, the present invention provides a neutron spectrum detection system, comprising: a water pumping and injecting system, a signal acquisition unit, a data processing unit, a display unit and a water pumping and injecting multi-layered concentric sphere device, wherein the water pumping and injecting multi-layered concentric sphere device comprises a neutron detector, a plurality of shells concentrically provided, and a water pumping and injecting device; wherein an innermost shell surrounds a surface of the neutron detector; gaps are formed between adjacent shells for containing liquid; the shells are made of an aluminum material; a valve is arranged on each of the shells except the innermost shell; the water pumping and injecting device is connected to the valve of each of the shells except the innermost shell, so as to input water into the gaps or output the water from the gaps; the water pumping and injecting system is connected to the water pump device, the signal acquisition unit is connected to the neutron detector, and the data processing unit is connected to the data acquisition unit as well as the display unit; wherein:

the water pumping and injecting system inputs the water into the gaps or output the water from the gaps through the water pumping and injecting device;

the signal acquisition unit collects pulse signals outputted from the neutron detector, converts the pulse signals into digital signals, and computes count values of the digital signals;

the data processing unit collects the count values to form a matrix, obtains a neutron spectrum with a response function matrix, and sends the neutron spectrum to the display unit for displaying.

Preferably, the gaps have different widths from each other.

Preferably, the water pumping and injecting multi-layered concentric sphere device further comprises a lead shell, wherein the lead shell is provided on an external surface of one of the shells.

According to the water pumping and injecting multi-layered concentric sphere device and the neutron spectrum detection system of the present invention, the present invention provides a water pumping and injecting multi-layered concentric sphere device, comprising: a neutron detector, a plurality of shells concentrically provided, and a water pumping and injecting device; wherein an innermost shell surrounds a surface of the neutron detector; gaps are formed between adjacent shells for containing liquid; the shells are made of an aluminum material; a valve is arranged on each of the shells except the innermost shell; the water pumping and injecting device is connected to the valve of each of the shells except the innermost shell, so as to input water into the gaps or output the water from the gaps. Compared with conventional neutron spectrum detectors, weight of the water pumping and injecting multi-layered concentric sphere device and the neutron spectrum detection system of the present invention is greatly reduced, which is conducive to transportation and utilization. Meanwhile, combination of neutron spectrum data measurement and measurement data are increased.

These and other objectives, features, and advantages of the present invention will become apparent from the following detailed description, the accompanying drawings, and the appended claims.

BRIEF DESCRIPTION OF THE DRAWINGS

To more clearly describe the technical solutions in the embodiments of the present invention, the following briefly introduces the accompanying drawings required for describing the embodiments. It is to be understood that the following drawings merely illustrate some embodiments of the present invention and therefore, should not be regarded as a limitation on the range. For those skilled in the art, other related drawings may also be obtained based on these drawings without any creative work.

ELEMENT REFERENCE

1—neutron spectrum detection system, 10—water pumping and injecting multi-layered concentric sphere device, 11—neutron detector, 12—shell, 121—valve, 122—gap, 13—water pumping and injecting device, 131—through hole, 14—lead shell, 20—water pumping and injecting system, 21—input pump, 22—output pump, 23—pool, 24—pipe, 30—signal acquisition unit, 40—data processing unit, 50—display unit.

DETAILED DESCRIPTION OF THE PREFERRED EMBODIMENT

To make the objectives, technical solutions, and advantages of the embodiments of the present invention more comprehensible, the technical solutions in the embodiments of the present invention are clearly and completely described as follows with reference to the accompanying drawings of the present invention. Apparently, the described embodiments are a part but not all of the embodiments of the present invention. The components of the embodiments of the present invention, generally described and illustrated in the figures herein, may be arranged and designed in a wide variety of different configurations.

Accordingly, the following detailed description of the embodiments of the present invention with accompanying drawings is not intended to limit the scope of the present invention which is claimed, but merely to illustrate selected embodiments of the present invention. All other embodiments obtained by persons of ordinary skill in the art based on the embodiments of the present invention without creative efforts shall fall within the protection scope of the present invention.

It should be noted that same reference numbers and letters designate same terms in the following figures, and therefore, they may not be defined or explained in any subsequent drawings.

Figure 1:
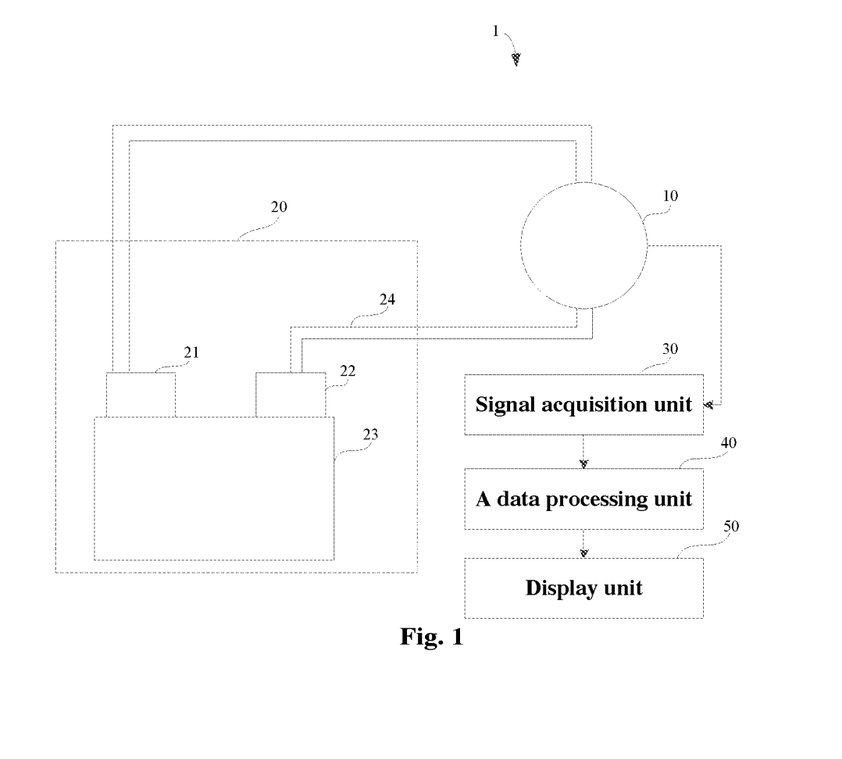
FIG. 1 is a structural view of a neutron spectrum detection system according to an embodiment of the present invention.

FIG. 1 is a structural view of a neutron spectrum detection system 1 according to an embodiment of the present invention. The neutron spectrum detection system 1 comprises a water pumping and injecting multi-layered concentric sphere device 10, a water pumping and injecting system 20, a signal acquisition unit 30, a data processing unit 40, and a display unit 50.

Figure 2:
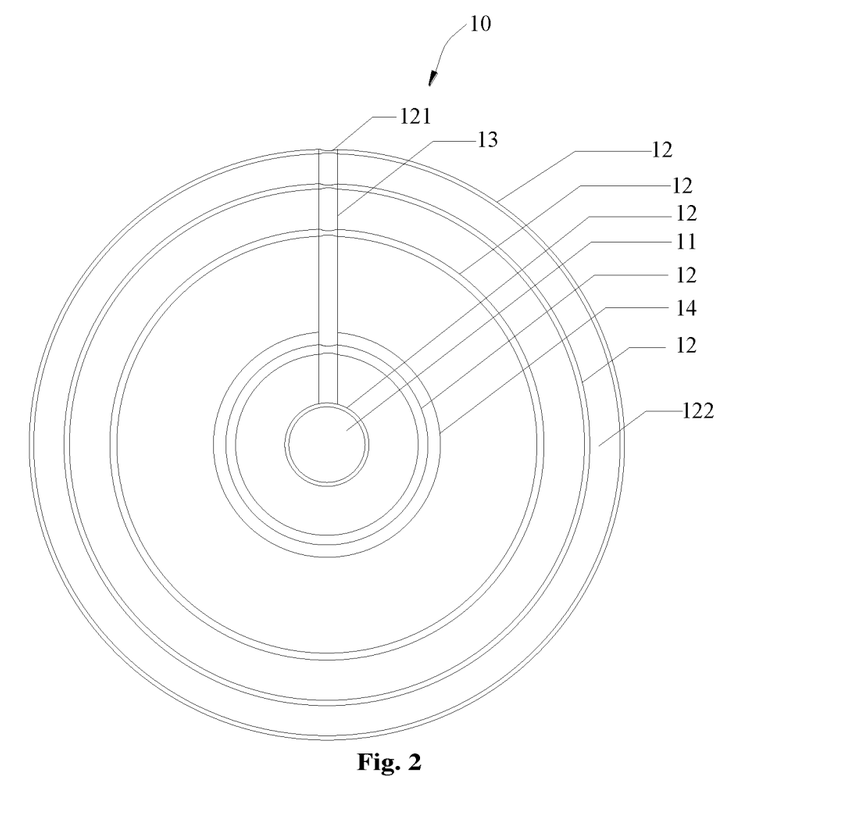
FIG. 2 is a structural view of a water pumping and injecting multi-layered concentric sphere device according to the embodiment of the present invention.

FIG. 2 is a structural view of a water pumping and injecting multi-layered concentric sphere device 10 according to the embodiment of the present invention. The water pumping and injecting multi-layered concentric sphere device 10 comprises a neutron detector 11, a plurality of shells 12 concentrically provided, and a water pumping and injecting device 13. The neutron detector 11 is a $^3$He spherical neutron detector.

An innermost shell of the shells 12 surrounds a surface of the neutron detector 11, and gaps 122 are formed between adjacent shells for containing liquid. Preferably, the liquid is water, which is low in cost and can be easily obtained.

The shells 12 are made of an aluminum material; a valve 121 is arranged on each of the shells 12 except the innermost shell; the water pumping and injecting device 13 is connected to the valve 121 of each of the shells 12 except the innermost shell, so as to input water into the gaps 122 or output the water from the gaps 122. Conventional multi-layer concentric ball device adopts polyethylene shells. In order to ensure the stability and safety of the device, the thickness of the polyethylene shell is large, usually more than 1 cm. Due to the density of polyethylene is close to the water, the conventional multi-layer concentric ball device is generally heavy, which is not conducive to transport and use. According to the embodiment, the shells 12 are made of the aluminum material in a form of elementary substance or alloy, which is not limited by the embodiment. Aluminum has a low density. Therefore, aluminum shells 12 with relative small thicknesses can provide the same effect of polyethylene shell with relative large thicknesses, but the weight is greatly decreased. According to the embodiment, thicknesses of the shells are 1 mm-5 mm. Preferably, for ensuring measurement performance and stable structure, the thicknesses of the shells are all 2 mm. In addition, the inventor has studied and found that the aluminum material has no influence on high energy during neutron measurement, and influence on low energy is negligible, which ensures the accuracy of measurement.

Figure 3:
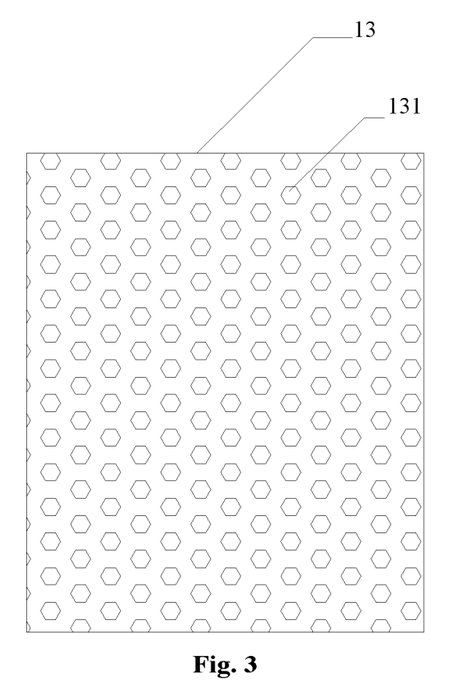
FIG. 3 is a sectional view of a water pumping and injecting device according to the embodiment of the present invention.

Preferably, the water pumping and injecting device is a pipe whose surface has through holes. FIG. 3 is a sectional view of a water pumping and injecting device according to the embodiment of the present invention. For inputting the water into the gaps 122, the corresponding valve 121 is opened for inputting the water into the pipe. At this moment, the water enters the gaps 122 through the through holes 131 of the pipe. For example, for inputting the water into the gap 122 of the innermost shell, all valves 121 should be opened for inputting the water into the pipe. When the gap 122 of the innermost shell is fully filled, the valve 121 of a first shell outside the innermost shell is closed. For outputting the water from the gaps 122, the corresponding valve 121 is opened for outputting the water through the through holes of the pipe. For example, for outputting the water of the innermost shell, all valves 121 should be opened for outputting the water from the gap 122 of the innermost shell, then all valves 121 are closed.

Referring to FIG. 1, the water pumping and injecting system 20 is connected to the water pump device 13, the signal acquisition unit 30 is connected to the neutron detector 11, and the data processing unit 40 is connected to the data acquisition unit 30 as well as the display unit 50.

The water pumping and injecting system 20 inputs the water into the gaps 122 or output the water from the gaps 122 through the water pumping and injecting device 13.

The water pumping and injecting system 20 comprises an input pump 21, an output pump 22, a pool 23, and the pipe 24, wherein both the input pump 21 and the output pump 22 are connected to the water pumping and injecting device 13 through the pipe 24. The input pump 21 and the output pump 22 are connected to the pool 23. The input pump 21 moves the water out of the pool 23 and into the water pumping and injecting device 12 through the pipe 24, so as to input the water into the gaps 122. The output pump 22 moves the water out of the water pumping and injecting device 13 and into the pool 23.

The signal acquisition unit 30 collects pulse signals outputted from the neutron detector 11, converts the pulse signals into digital signals, and computes count values of the digital signals. The data processing unit 40 collects the count values to form a matrix, obtains a neutron spectrum with a response function matrix, and sends the neutron spectrum to the display unit 50 for displaying.

According to the embodiment of the present invention, when measuring with the neutron spectrum detection system 1, the gaps 122 of the water pumping and injecting multi-layered concentric sphere device 10 are injected and measured in sequence according to a predetermined measurement method. For example, according to the embodiment, the water pumping and injecting multi-layered concentric sphere device 10 has 5 shells 12, so as to form 4 gaps 122 with different widths, wherein the widths are 40 mm, 80 mm, 20 mm and 10 mm from inside to outside. Combinations can be changed according to requirements for forming different measurement widths, and the gaps 122 with different widths provides combination variety compared with gaps with same widths while a volume of the water pumping and injecting multi-layered concentric sphere device 10 is kept small, so as to increase measurement data. During each neutron measurement, the neutron detector 11 outputs the pulse signals. The signal acquisition unit 30 converts the pulse signals into digital signals, and computes count values of the digital signals in sequence before sending to the data processing unit 40. The data processing unit 40 collects each of the count values outputted by the signal acquisition unit 30 to form a matrix, obtains a neutron spectrum with a pre-imported response function matrix:

$$\begin{bmatrix} R_{11} & \cdots & R_{15} \\ \vdots & \cdots & \vdots \\ R_{i1} & \cdots & R_{i5} \end{bmatrix}, \quad (1)$$

and sends the neutron spectrum to the display unit 50 for displaying. Specifically, the matrix converted by the data processing unit 40 is:

$$\begin{bmatrix} N_1 \\ N_2 \\ \vdots \\ N_5 \end{bmatrix} \quad (2)$$

According to a neutron spectrum calculating formula:

$$N = \sum_{E\ min}^{E\ max} R_\phi(E)\phi(E)d_E \quad (3)$$

wherein $R_\phi(E)$ is an energy response function of the neutron detector 11, $\phi(E)$ is the neutron spectrum, N is a count of the neutron detector 11, E is neutron energy, $d_E$ is integral, M is an omitted value between N1 and N5; the above formula is discretized as:

$$N = \sum_{E\ min}^{E\ max} (R_\phi)\phi(E) \quad (4)$$

The formulas (1) and (2) are brought into the formula (4) to obtain a formula (5)

$$\begin{bmatrix} R_{11} & \cdots & R_{15} \\ \vdots & \cdots & \vdots \\ R_{i1} & \cdots & R_{i5} \end{bmatrix} \begin{bmatrix} E_1 \\ E_2 \\ \vdots \\ E_5 \end{bmatrix} = \begin{bmatrix} N_1 \\ N_2 \\ \vdots \\ N_5 \end{bmatrix} \quad (5)$$

wherein $$\begin{bmatrix} E_1 \\ E_2 \\ \vdots \\ E_5 \end{bmatrix}$$

is the neutron energy corresponding to each count value of the neutron spectrum.

For stopping measurement, the input pump 21 is shut down, and all valves 121 of the shells 12 are opened. Meanwhile, the output pump 22 is turned on until the water is fully discharged.

For enlarging a measurement range, according to the embodiment, a lead shell 14 is used. Lead has a high atomic number, which increases sensitivity to high energy neutrons. Lead has a high density. As a result, for decrease the weight of the water pumping and injecting multi-layered concentric sphere device 10, the lead shell 14 is provided on an external surface of a second shell or a third shell counting from inside to outside. Preferably, a thickness of the lead shell 14 is 5 mm.

Figure 4:
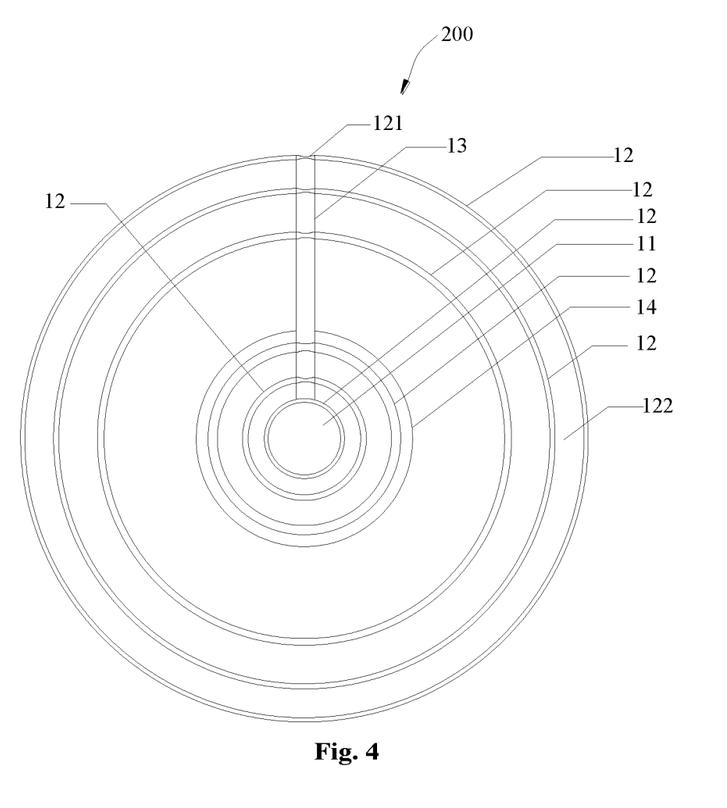
FIG. 4 is a structural view of a water pumping and injecting multi-layered concentric sphere device according to another embodiment of the present invention.

FIG. 4 is a structural view of a water pumping and injecting multi-layered concentric sphere device 200 according to another embodiment of the present invention. The water pumping and injecting multi-layered concentric sphere device 200 has 6 shells 12 and 5 gaps 122 with widths of 10 mm, 20 mm, 80 mm, 40 mm and 25 mm from inside to outside. A lead shell 14 is provided on an external surface of a third shell counting from inside to outside, and a thickness of the lead shell 14 is 10 mm.

Figure 5:
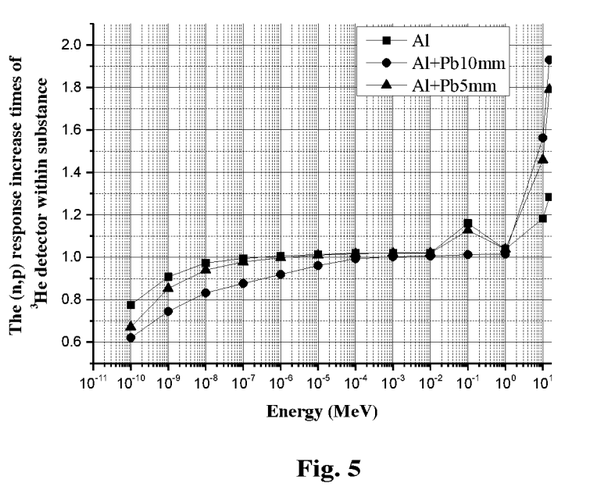
FIG. 5 illustrates energy response simulation results of the neutron spectrum detection system on $10^{-10}$-10 MeV neutrons according to the embodiment of the present invention.

FIG. 5 illustrates energy response simulation results of the neutron spectrum detection system on $10^{-10}$-10 MeV neutrons according to the embodiment of the present invention.

Figure 6:
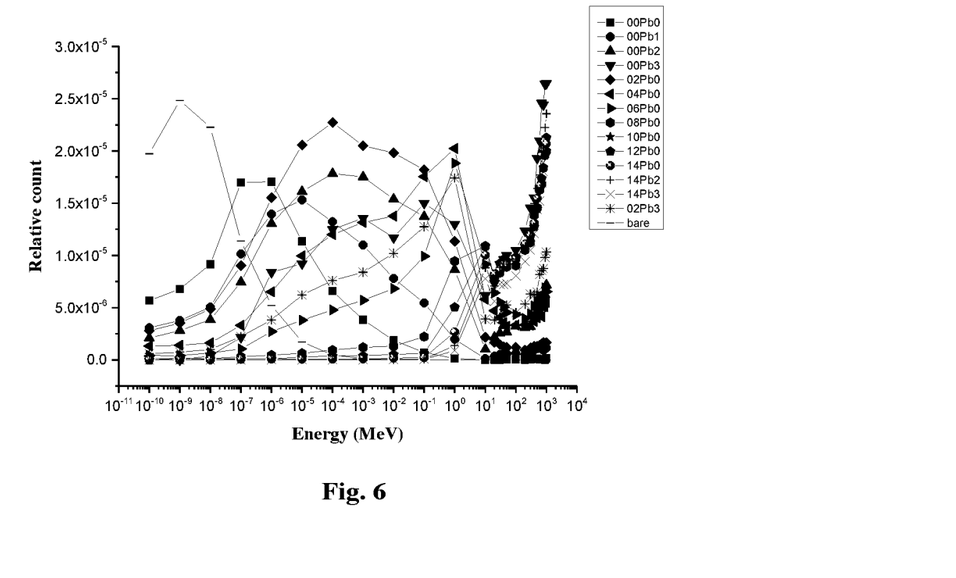
FIG. 6 illustrates energy response simulation results of the neutron spectrum detection system on $10^{-10}$-$10^3$ MeV neutrons according to the embodiment of the present invention.

FIG. 6 illustrates energy response simulation results of the neutron spectrum detection system on $10^{-10}$-$10^3$ MeV neutrons according to the embodiment of the present invention.

Compared with conventional high-energy multi-sphere neutron spectrometer, the present invention is better than a conventional three-layer structure, whose response to neutrons increases as a water thickness increases, and the response shows an increasing trend as the neutron energy increases. Therefore, it is ensured that the multi-sphere neutron spectrometer has a more ideal energy response for neutrons above 10 MeV.

In summary, the embodiments of the present invention provide the water pumping and injecting multi-layered concentric sphere device and the neutron spectrum detection system. The water pumping and injecting multi-layered concentric sphere device comprises: a neutron detector, a plurality of shells concentrically provided, and a water; wherein an innermost shell surrounds a surface of the neutron detector; gaps are formed between adjacent shells for containing liquid; the shells are made of an aluminum material; a valve is arranged on each of the shells except the innermost shell; the water pumping and injecting device is connected to the valve of each of the shells except the innermost shell, so as to input water into the gaps or output the water from the gaps. Compared with conventional neutron spectrum detectors, weight of the water pumping and injecting multi-layered concentric sphere device and the neutron spectrum detection system of the present invention is greatly reduced, which is conducive to transportation and utilization. Meanwhile, combination of neutron spectrum data measurement and measurement data are increased.

In the description of the present invention, it should be noted that the terms "inside", "outside", and the like indicate the orientation or positional relationship based on the orientation or positional relationship shown in the drawings, or are conventionally placed when the inventive product is used. The orientation or positional relationship is merely for convenience of describing the present invention and simplification of the description, and does not indicate or imply that the pointed device or element must have a specific orientation, be constructed and operated in a specific orientation, and therefore should not be construed as limiting the present invention.

In the description of the present invention, it should also be noted that the terms "set", "install", "connect", and "communicate" should be interpreted broadly unless specifically defined or limited otherwise. For example, they may be fixed connections. It can also be a detachable connection, or an integral connection; it can be a mechanical connection or an electrical connection; it can be directly connected, or it can be indirectly connected through an intermediary medium, and it can be the internal communication of two components. For a person of ordinary skill in the art, the specific meanings of the above terms in the present invention can be understood in specific cases.

The foregoing descriptions are merely preferred embodiments of the present invention and are not intended to limit the present invention. For those skilled in the art, the present invention may have various changes and modifications. Any modification, equivalent replacement, and improvement made within the spirit and principle of the present invention shall fall within the protection scope of the present invention. It should be noted that similar reference numerals and letters refer to similar items in the figures, and therefore, once an item is defined in one figure, it may not be further defined or explained in subsequent figures.

What is claimed is:

1. A water pumping and injecting multi-layered concentric sphere device, comprising: a neutron detector, a plurality of shells concentrically provided, and a water pumping and injecting device; wherein an innermost shell of the shells surrounds a surface of the neutron detector; gaps are formed between adjacent shells for containing liquid; the shells are made of an aluminum material; a valve is arranged on each of the shells except the innermost shell; the water pumping and injecting device is connected to the valve of each of the shells except the innermost shell, so as to input water into the gaps or output the water from the gaps.

2. The water pumping and injecting multi-layered concentric sphere device, as recited in claim 1, wherein the gaps have different widths from each other.

3. The water pumping and injecting multi-layered concentric sphere device, as recited in claim 1, further comprising a lead shell, wherein the lead shell is provided on an external surface of one of the shells.

4. The water pumping and injecting multi-layered concentric sphere device, as recited in claim 3, wherein the lead shell is provided on an external surface of a second shell or a third shell counting from inside to outside.

5. The water pumping and injecting multi-layered concentric sphere device, as recited in claim 1, wherein thicknesses of the shells are 1 mm-5 mm.

6. The water pumping and injecting multi-layered concentric sphere device, as recited in claim 2, wherein thicknesses of the shells are 1 mm-5 mm.

7. The water pumping and injecting multi-layered concentric sphere device, as recited in claim 3, wherein thicknesses of the shells are 1 mm-5 mm.

8. The water pumping and injecting multi-layered concentric sphere device, as recited in claim 4, wherein thicknesses of the shells are 1 mm-5 mm.

9. The water pumping and injecting multi-layered concentric sphere device, as recited in claim 5, wherein the thicknesses of the shells are all 2 mm.

10. The water pumping and injecting multi-layered concentric sphere device, as recited in claim 6, wherein the thicknesses of the shells are all 2 mm.

11. The water pumping and injecting multi-layered concentric sphere device, as recited in claim 7, wherein the thicknesses of the shells are all 2 mm.

12. The water pumping and injecting multi-layered concentric sphere device, as recited in claim 8, wherein the thicknesses of the shells are all 2 mm.

13. The water pumping and injecting multi-layered concentric sphere device, as recited in claim 1, wherein the water pumping and injecting device is a pipe whose surface has through holes.

14. A neutron spectrum detection system, comprising: a water pumping and injecting system, a signal acquisition unit, a data processing unit, a display unit and a water pumping and injecting multi-layered concentric sphere device, wherein the water pumping and injecting multi-layered concentric sphere device comprises a neutron detector, a plurality of shells concentrically provided, and a water pumping and injecting device; wherein an innermost shell of the shells surrounds a surface of the neutron detector; gaps are formed between adjacent shells for containing liquid; the shells are made of an aluminum material; a valve is arranged on each of the shells except the innermost shell; the water pumping and injecting device is connected to the valve of each of the shells except the innermost shell, so as to input water into the gaps or output the water from the gaps; the water pumping and injecting system is connected to the water pump device, the signal acquisition unit is connected to the neutron detector, and the data processing unit is connected to the data acquisition unit as well as the display unit; wherein:

the water pumping and injecting system inputs the water into the gaps or output the water from the gaps through the water pumping and injecting device;

the signal acquisition unit collects pulse signals outputted from the neutron detector, converts the pulse signals into digital signals, and computes count values of the digital signals;

the data processing unit collects the count values to form a matrix, obtains a neutron spectrum with a response function matrix, and sends the neutron spectrum to the display unit for displaying.

15. The neutron spectrum detection system, as recited in claim 14, wherein the gaps have different widths from each other.

16. The neutron spectrum detection system, as recited in claim 14, wherein the water pumping and injecting multi-layered concentric sphere device further comprises a lead shell, wherein the lead shell is provided on an external surface of one of the shells.

* * * * *